US 6,620,354 B1

(12) United States Patent
Bessemer et al.

(10) Patent No.: US 6,620,354 B1
(45) Date of Patent: *Sep. 16, 2003

(54) APPARATUS AND METHOD FOR PRODUCING AND CUTTING EXTRUDED MATERIAL USING TEMPERATURE FEEDBACK

(75) Inventors: Robert H. Bessemer, Pittsburgh, PA (US); William T. Jones, East Grand Rapids, MI (US); Robert L. Pader, Pittsburgh, PA (US)

(73) Assignee: The Conair Group, Inc., Pittsburgh, PA (US)

( * ) Notice: Subject to any disclaimer, the term of this patent is extended or adjusted under 35 U.S.C. 154(b) by 59 days.

This patent is subject to a terminal disclaimer.

(21) Appl. No.: 09/594,539

(22) Filed: Jun. 14, 2000

Related U.S. Application Data

(63) Continuation-in-part of application No. 09/450,383, filed on Nov. 29, 1999.

(51) Int. Cl.$^7$ .......................... B29C 47/92; B29C 47/90
(52) U.S. Cl. ................... 264/40.6; 264/148; 264/209.4
(58) Field of Search ............................... 264/40.6, 138, 264/40.1, 40.2, 40.3, 40.4, 40.5, 40.7, 145, 148, 149, 150, 151, 210.2, 177.1, 178 R

(56) References Cited

U.S. PATENT DOCUMENTS

| | | | |
|---|---|---|---|
| 2,984,631 A | | 5/1961 | Talalay et al. |
| 3,733,059 A | * | 5/1973 | Pettit ........................... 366/79 |
| 3,835,212 A | | 9/1974 | Piacente |
| 4,029,452 A | | 6/1977 | Schippers et al. |
| 4,181,487 A | | 1/1980 | Kessler |
| 4,190,473 A | | 2/1980 | Soecknick et al. |
| 4,212,171 A | | 7/1980 | Soecknick |
| 4,290,986 A | * | 9/1981 | Koschmann .............. 264/40.3 |
| 4,401,424 A | | 8/1983 | De Zen |
| 4,452,752 A | | 6/1984 | Harder et al. |

(List continued on next page.)

FOREIGN PATENT DOCUMENTS

| | | | | |
|---|---|---|---|---|
| DE | 3301556 | | 5/1990 | |
| EP | 0 248 280 | | 12/1987 | |
| EP | 0 425 944 | | 1/1994 | |
| FR | 78 33678 | | 6/1980 | |
| GB | 2 127 183 | | 7/1986 | |
| GB | 2 218 030 | | 11/1989 | |
| JP | 2000141457 A | * | 5/2000 | ........... B29C/47/92 |
| NL | 1 923 490 | | 11/1970 | |

*Primary Examiner*—Mark Eashoo
*Assistant Examiner*—Geoffrey P. Shipsides
(74) *Attorney, Agent, or Firm*—Buchanan Ingersoll, P.C.

(57) ABSTRACT

An apparatus and method for extruding, cooling and cutting an extrusion using temperature feedback can include an extruder for producing an extrudate which can be fed through appropriate sizing, support and cooling devices, which can include one or more of a vacuum chamber, cooling chamber, and calibrators having internal cooling passages. The apparatus can also include a cutting blade, a programmable temperature controller for controlling the cooling of the extrudate based upon feedback on the temperature of the extrudate sensed near the cutting blade and/or prior to a device which feeds the extrusion through the system. The method can include sensing the temperature of the extrudate, at a point near the cutting blade and/or prior to the feed device, subsequent to extrusion being passed through the sizing, support and/or cooling devices. Such feedback can be used to control the cooling of the extrudate such that the extrudate is maintained within a desired range of temperature as it is cut and/or engaged by the feeding device. Where calibrators are used the apparatus can include additional temperature sensors at different sides the calibrators and/or different sides of a multi-sided extrudate. Such additional temperature feedback can be used by the temperature controller to adjust the temperature of the extrudate, including at different surfaces of a multi-sided extrudate.

21 Claims, 8 Drawing Sheets

U.S. PATENT DOCUMENTS

| | | | |
|---|---|---|---|
| 4,471,790 A | * | 9/1984 | Davis et al. ................. 131/301 |
| 4,475,351 A | | 10/1984 | Klee |
| 4,524,548 A | | 6/1985 | Klee et al. |
| 4,530,650 A | | 7/1985 | Milani |
| 4,654,094 A | | 3/1987 | Ritter |
| 4,685,879 A | | 8/1987 | Purstinger et al. |
| 4,719,071 A | | 1/1988 | Capelle |
| 4,726,195 A | | 2/1988 | Klee |
| 4,755,118 A | | 7/1988 | Ondush et al. |
| 4,843,576 A | * | 6/1989 | Smith et al. ................. 700/299 |
| 4,931,232 A | | 6/1990 | Lermuzeaux et al. |
| 5,054,292 A | | 10/1991 | Klee |
| 5,108,277 A | | 4/1992 | Dixon |
| 5,316,459 A | | 5/1994 | Melkonian et al. |
| 5,326,508 A | | 7/1994 | Kaefer et al. |
| 5,340,295 A | | 8/1994 | Preiato et al. |
| 5,346,379 A | | 9/1994 | Wolfl et al. |
| 5,355,938 A | * | 10/1994 | Hosoya et al. ............... 165/263 |
| 5,525,289 A | | 6/1996 | Lupke et al. |
| 5,614,137 A | * | 3/1997 | Pandit et al. ............... 264/40.6 |
| 5,879,732 A | | 3/1999 | Caracciolo, Jr. et al. |
| 5,892,207 A | | 4/1999 | Kawamura et al. |
| 5,921,091 A | | 7/1999 | Foss et al. |
| RE36,585 E | | 2/2000 | Purstinger |
| 6,066,288 A | | 5/2000 | Purstinger |

\* cited by examiner

APPARATUS AND METHOD FOR PRODUCING AND CUTTING EXTRUDED MATERIAL USING TEMPERATURE FEEDBACK

RELATED APPLICATION

This application is a continuation-in-part application of copending U.S. patent application Ser. No. 09/450,383, filed Nov. 29, 1999.

BACKGROUND

The invention relates generally to the extrusion and cutting of thermoplastic material, and more particularly to using feedback from a temperature sensor to provide control over the cooling rate of the extruded material to improve the process of cutting the extrusion.

Methods and systems are known in the art for simultaneously producing and cutting a thermoplastic extrusion in a continuous process. For example, the apparatus may include an extruder to produce a continuous extrusion, whether hollow or solid. In association with the extruder, such apparatus may include a vacuum chamber, in the case of hollow extrusions, and a cooling chamber to cool the extrudate as it is extruded. A belt or rollers may also be provided to feed the extrudate from the extruder to a cutting blade which can cut the extrudate to desired lengths The vacuum chamber can help support a hollow extrusion until it is sufficiently cooled to maintain its shape. Where the extrusion is solid or semi-hollow (such as a channel), one or more devices known as calibrators can be used in place of the vacuum chamber in order to align and size the extrusion as it is produced and until sufficiently cooled The calibrators can have internal passageways forming cooling circuits through which coolant can be circulated to cool the extrudate as it passes through the calibrators. Such known apparatus can further include a cooling chamber, which can be partially or completely filled with coolant to cool the extrudate as it passes through the chamber. Alternatively, instead of immersing the hot extrudate in coolant, the cooling chamber can have spray nozzles which spray the extrudate with the coolant to effect the cooling process. The cooling processes in the vacuum chamber, calibrators and the cooling chamber can be controlled by conventional electronic devices in a known manner which is described in more detail below. Other coolant mediums which have been used in cooling processes can be referred to collectively as refrigerants, including cryogens. Cryogens include liquid nitrogen, liquid carbon dioxide, liquid air and other refrigerants having normal boiling points substantially below minus 50° F. (−46° C.). Cryogens, due to their extremely low boiling point, naturally and virtually instantaneously expand into gaseous form when dispersed into the air. This results in a radical consumption of heat. The resilient temperature can be reduced to hundreds of degrees below zero (Fahrenheit) in a relatively short time.

Conventional methods of chilling extrudates can include feeding a continuous hot extrudate from the extruder through a vacuum chamber, or calibrators, and then to a cooling chamber which cools the hot extrudate to a desired temperature. Although the vacuum chamber and calibrators provide some initial cooling, the cooling is generally mainly provided in the cooling chamber. From the cooling chamber the cooled extrudate is fed to cutting blades which can cut the cooled extrudate into sections of the desired lengths. The temperature of the extrudate when cut by the cutting blades can be crucial to obtaining an acceptable product. If the temperature of the extrudate is either too hot or too cold when it is cut, the cut sections can be of unacceptable quality. For example, if the extrudate is too cold when cut, deformation or fracturing can occur. Conversely, if the extrudate is too hot when cut, the ends of the cut sections may stick together. In additional to problems with the cut parts, the extrudate may warp if the temperature is not controlled properly. Consequently, it can be vital to control the temperature of the extrudate to prevent warping and so that it is within a certain desired range of temperatures at the point where it is cut by the cutting blade in order to produce products of an acceptable quality. In order to obtain the proper temperature of the extrudate at the point of cutting, the conventional manner is based upon a manually performed trial-and-error process. For example, a certain temperature is estimated and the cooling chamber is brought to that temperature. Next, the quality of the cut is closely observed to determine whether the temperature of the extrudate is too hot or too cold. If the cutting process indicates that the temperature of the extrudate is too hot, the temperature in the cooling chamber is lowered, typically in a small increment to avoid overshooting the desired temperature. After the temperature adjustment has had an opportunity to take effect, the cutting process is again closely observed to determine whether the appropriate temperature has been achieved. If the cut quality again indicates that a temperature adjustment is needed, the process is repeated by adjusting the temperature in the cooling chamber and observing the cut quality. This procedure may be repeated until the cut quality indicates that the proper temperature has been achieved. In addition to the time required to arrive at the desired temperature, material is wasted with each cut that produces unacceptable parts until the proper temperature is finally achieved.

Accordingly, there is a need for an improved apparatus and method for bringing the extrudate to the proper temperature in a more efficient and less wasteful manner.

SUMMARY

An apparatus and method for extruding and cutting an extrusion can be provided which more quickly and efficiently brings a hot extrudate to the temperature required to permit the extrudate to be properly cut. The apparatus can include an extruder for producing a continuous extrusion which can be fed through one or more of a vacuum chamber, calibrators, and a cooling chamber which brings the extrudate to the desired temperature. The extrudate can be fed to a blade for cutting the extrudate into desired lengths by various types of known conveyance mechanisms. The apparatus can include a temperature controller for controlling the temperature in the cooling chamber. The temperature controller can include a programmable processor for automatically regulating the temperature in the cooling chamber. According to a presently preferred embodiment, the apparatus can include one or more temperature sensors which can be positioned just prior to the cutting blade and/or just prior to the location where the extrudate is engaged by the conveyance mechanism in order to provide feedback on the temperature of the extrudate at one or both of those points. The temperature feedback can be provided to the temperature controller which can use the feedback to control the temperature in the cooling chamber so that the cut quality is enhanced and/or so that the extrusion is not deformed by the conveyance mechanism. The cooling system can utilize various coolants, including water and cryogens. Similarly to the conventional manner, the cut quality can be observed to determine when an acceptable temperature has been achieved. In contrast however, the temperature at the cooling chamber can be regulated directly from the actual temperature of the extrudate near the cutting blade, instead of simply gradually adjusting the temperature up and down based upon what the cut looks like, as in the trial-and-error method. This process can similarly be employed by observing whether the extrusion is being deformed by the conveyance mechanism. Also, once a proper temperature has been arrived at, that information can be stored in a memory portion of the processor in the temperature controller, which can then use that information as a reference point in the future each time the process is carried out using the same materials and cutting conditions. Thus, no observation of the cut quality need normally be done to start running the process the next time and the system can automatically adjust to changes in ambient temperatures. In order to ensure that the temperature of the extrudate is within a desired range of temperatures at the point at which the extrudate is cut by the cutting blade, the temperature controller can continuously monitor feedback from the temperature sensor near the cutting blade. Any necessary adjustments in the temperature can be automatically carried out by the temperature controller, thus eliminating much, if not all, of the manual adjustments previously required according to the prior art method.

Moreover, where calibrators are used additional temperature sensors can be utilized in conjunction with cooling circuits provided in the calibrators. The temperature feedback from such sensors can be provided to a temperature controller which can use such feedback to control the temperature of the coolant circulated through the aforementioned cooling circuits. Besides being used to generally control the cooling of the extrudate, similarly to as described in connection with the cooling chamber, this feedback information and temperature control can advantageously permit different surfaces of a multi-sided extrudate to be cooled at different rates.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN PREFERRED EMBODIMENTS

Figure 1:
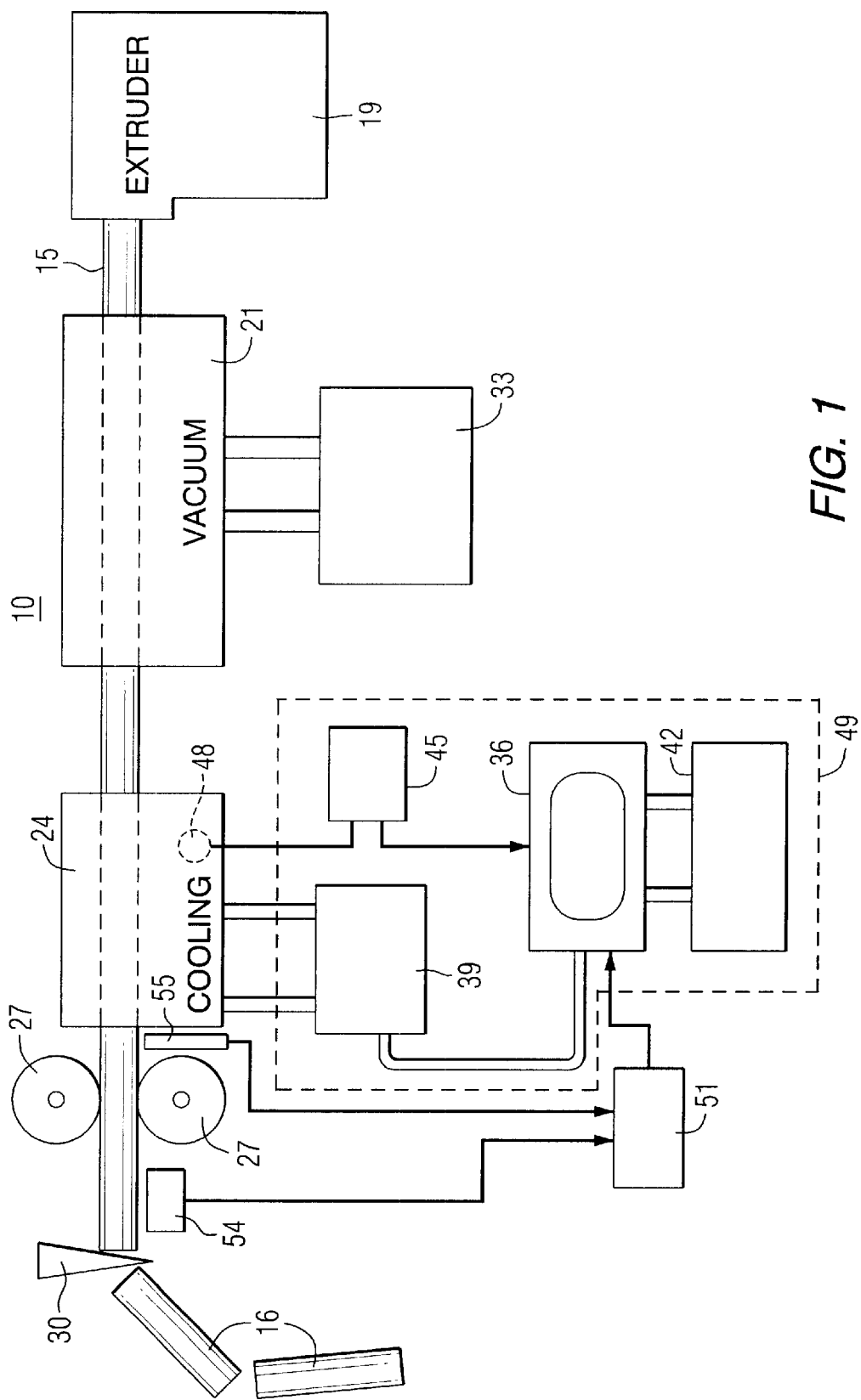
FIG. 1 shows a presently preferred embodiment of an extrusion and cutting apparatus according to the invention.

Referring now to the drawing figures wherein like reference numbers refer to similar parts throughout the several views, FIG. 1 illustrates an apparatus 10 according to a presently preferred embodiment of the invention for producing and cutting an extrudate 15. In the embodiment shown, the extrudate 15 can be hollow. The apparatus 10 can include an extruder 19 which produces, for example, a hollow extrudate 15 which can be directed through a vacuum chamber 21 and a cooling chamber 24. The vacuum chamber 21 can provide support to the hollow extrudate 15 until it is sufficiently cooled to a stable temperature. A puller mechanism, such as rollers 27, can be provided to feed the extrudate 15 to a cutting blade 30 which can cut the extrudate 15 into sections of a desired length. By the time the extrudate 15 is engaged by the rollers 27 is should be cooled sufficiently that the rollers 27 do not deform the extrudate 15 as it is drawn through the cooling chamber 24 thereby. A conventional controller 33 for the vacuum chamber 21, which can include a pump, sensors and associated electronic control hardware/software, can be provided to regulate the vacuum in the vacuum chamber 21 in a well known manner. The vacuum chamber 21 and controller 33 can be provided in order to stabilize the hollow extrudate 15 until it has cooled sufficiently to maintain its shape. Without the vacuum chamber 21, the walls of the hollow extrudate 15 could deform or collapse before the extrudate 15 had time to cool to a sufficiently rigid state to support its shape. One type of vacuum chamber for performing this function is described, for example, in U.S. Pat. No. 5,340,295 to Preiato et al.

Although some, and possibly all, cooling of the extrudate 15 could be accomplished using a combined vacuum/cooling chamber, such as by providing coolant in a vacuum chamber, a separate cooling chamber 24 can be utilized in the presently preferred embodiment. The cooling chamber 24 can, for example, use water as the heat transfer fluid, and can be controlled to bring the extrudate 15 to the desired temperature, and to generally maintain it at that temperature. However, a preferred embodiment of the invention can utilize a liquid cryogen, preferably liquid nitrogen, as the coolant. The liquid nitrogen can be sprayed into the cooling chamber 24, but not necessarily onto the surface of the extrudate itself. Upon release into the air, liquid nitrogen rapidly expands into a gas, which results in a radical reduction in temperature within the cooling chamber, yet controllable depending on the amount of nitrogen dispersed, thus cooling the extrudate. A temperature controller 49 can include a pump, temperature sensors and electronic control devices. For example, the controller 49 can include a temperature regulator 36 and a temperature monitoring device 45, which can use feedback, such the water temperature in the cooling chamber 24, or simply the temperature in the cooling chamber where nitrogen is the coolant, from a temperature sensor 48. The temperature regulator 36 can also include a heat transfer unit 42, for example a "chiller" unit, but which may not be needed where a liquid cryogen is used as the coolant. In any case, the controller 49 can provide a control system to automatically regulate the temperature of the heat transfer fluid in the cooling chamber 24 to the desired temperature. The regulator 36 can receive feedback regarding the temperature of the heat transfer fluid, or temperature in the cooling chamber 24, via the temperature sensor 48 and can control the pump 39 to regulate the temperature up or down. For example, if the temperature of the heat transfer fluid is too high, the regulator 36 can control the pump 39 to deliver chilled heat transfer fluid to the cooling chamber 24 from the heat transfer unit 42. Conversely, if the heat transfer fluid temperature is too low, the regulator, which can include an internal heating unit, can control the pump to provide heated heat transfer fluid from the regulator 36. Where nitrogen is utilized as the coolant, the pump can be replaced with a valve used to admit nitrogen into the cooling chamber. Using the temperature feedback from sensor 48, the regulator 36 can thus generally maintain the temperature in the cooling chamber 24 within a range of desired temperatures.

According to a presently preferred embodiment of the apparatus 10, an additional temperature monitoring device 51 and temperature sensor 54 can be provided. Feedback from the second temperature sensor 54, which can preferably be positioned to measure the temperature of the extrudate 15 at a point near the cutting blade 30. The temperature monitoring device 51 can provide additional, valuable feedback to the temperature controller 49 for improved control over the cooling, and more particularly, the cutting process. The temperature of the extrudate 15 at the cutting blade 30 can be important feedback information for regulating the temperature of the heat transfer fluid in the cooling chamber 24 because of the desirability to regulate the cooling of the extrudate 15 such that the extrudate 15 is generally maintained within a certain range of desired temperatures when the extrudate 15 is cut by the cutting blade 30. This is desirable because there is a certain range of temperatures of the extrudate 15 at which the cutting process is most efficiently carried out. For example, if the temperature of the extrudate 15 at the cutting blade 30 is too high, the cut extrudate sections 16 will tend to stick together at the junction of the cut ends of the sections 16. On the other hand, for example, if the temperature of the extrudate 15 at the cutting blade 30 is too low, fracturing or deformation of the cut extrudate sections 16 can occur which produces an unacceptable section 16.

In the prior art process, the temperature of the extrudate 15 is controlled manually by regulating the temperature of the heat transfer fluid in the cooling chamber 24 according to a "trial and error" process. For example, an operator would observe the characteristics of the extrudate 15 as it is being cut at the blade 30. Based on the characteristics of the cut, the operator would determine whether the extrudate 15 was too hot or too cold. For example, if the ends of the cut sections 16 were tending to stick together, this could usually indicate that the temperature of the extrudate 15, at the point where the blade 30 was cutting it, was too high. Conversely, if the cut sections 16 were tending to fracture or deform when cut, this would normally indicate that the temperature of the extrudate 15 was too cold when it was cut. Based upon these observations, the operator would slightly adjust the temperature of the heat transfer fluid, which can be water, in the cooling chamber 24 accordingly. The operator would continue gradually adjusting the temperature at the cooling chamber 24, either up or down, until a temperature was arrived at which resulted in the extrudate 15 having a temperature at a point near the cutting blade 30 which produced an acceptable cut. Typically, the temperature would have to be adjusted in relatively small increments to avoid overshooting the proper temperature range. Consequently, the process of locating and maintaining the desired temperature tends to be slow and can also result in some amount of wasted materials in the process of arriving at the proper temperature range.

According to the present invention, this inefficient, manual trial-and-error method can be replaced by an improved method which can be faster and less wasteful. By utilizing feedback from the temperature sensor 54 near the blade 30, the regulation of the temperature in the cooling chamber 24 can be automatically controlled, for example, electronically by programming a processor, which can be part of the temperature regulator 36. The controller 49 can regulate the temperature of the heat transfer fluid in the cooling chamber 21 based upon the temperature of the extrudate 15 near the cutting blade 30. In this manner, the slow manual trial-and-error process of adjusting the temperature of the cooling chamber 24 can be replaced with a more efficient, accurate and automated process.

In a presently preferred embodiment of the invention, the temperature controller 49 includes the regulator 36 which can be connected the pump 39. The pump 39 can be used to circulate warm or cool heat transfer fluid through the cooling chamber 24 to affect the temperature thereof. The regulator 36 can be, for example, a device commonly called a "Thermolator™," which can include a programmable processor and may also have heating element for heating the heat transfer fluid. The heat transfer unit 42 can be provided to supply chilled heat transfer fluid to lower the temperature in the cooling chamber 24. Although the heat transfer fluid is preferably water, other types of heat transfer fluid could also be used. Additionally, the cooling chamber 24 can simply be partially, or completely, filled with heat transfer fluid or may have spray nozzles (not shown) for spraying the heat transfer fluid onto the extrudate 15.

Figure 2:
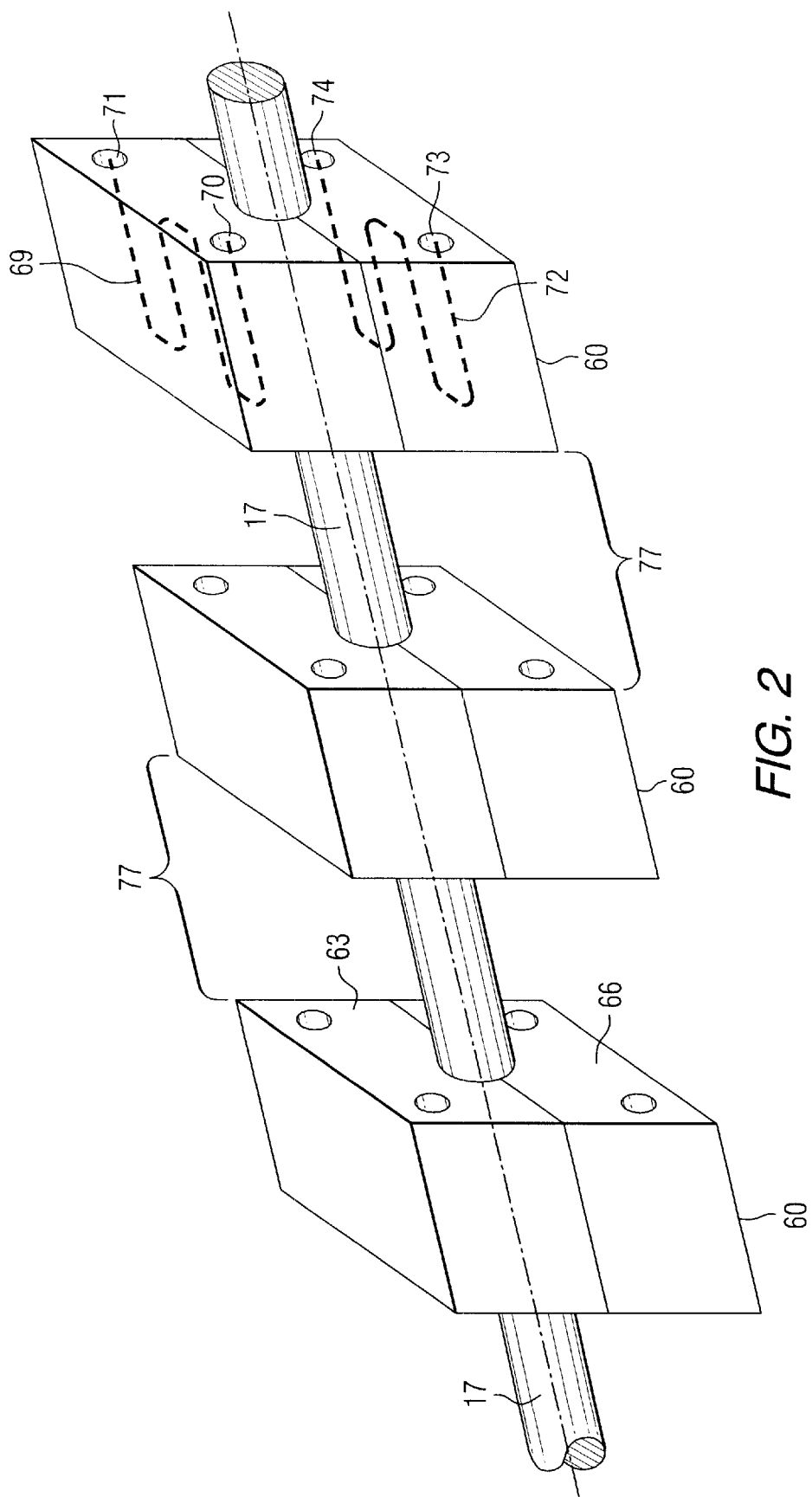
FIG. 2 shows how calibrators may be used instead of, or in addition to, a vacuum chamber.

In some cases, an extrudate 17 may have a solid, or semi-hollow cross section, such as a channel, instead of being hollow. Referring to FIG. 2, in such circumstances where the extrudate 17 is solid or semi-hollow, one or more sizing devices 60, commonly referred to as "calibrators," can be employed in place of the vacuum chamber 21. As shown, multiple calibrators 60 can be provided in a spaced apart manner to provide air gaps 77 therebetween. The calibrators 60 can commonly be two piece members having an upper section 63 that can be hinged to a lower section 66. Additionally, cooling circuits 69 and 72 can be provided in each of the upper 63 and lower 66 sections of the calibrators 60. Each cooling circuit 69, 72 can have inlet 70, 73 and outlet 71, 74 openings which can be plumbed to a source of heat transfer fluid. In this manner, heat transfer fluid can be pumped through each of the cooling circuits 69, 72 in order to cool the extrudate 17 as it is fed through each calibrator 60. The temperature of the extrudate 17 can be regulated using the calibrators 60 in combination with the temperature sensor 54 and temperature controller 49, in a manner similar to as described above for the process using a cooling chamber 24. Alternatively, the calibrators 60 could be used in combination with a cooling chamber 24.

Figure 3:
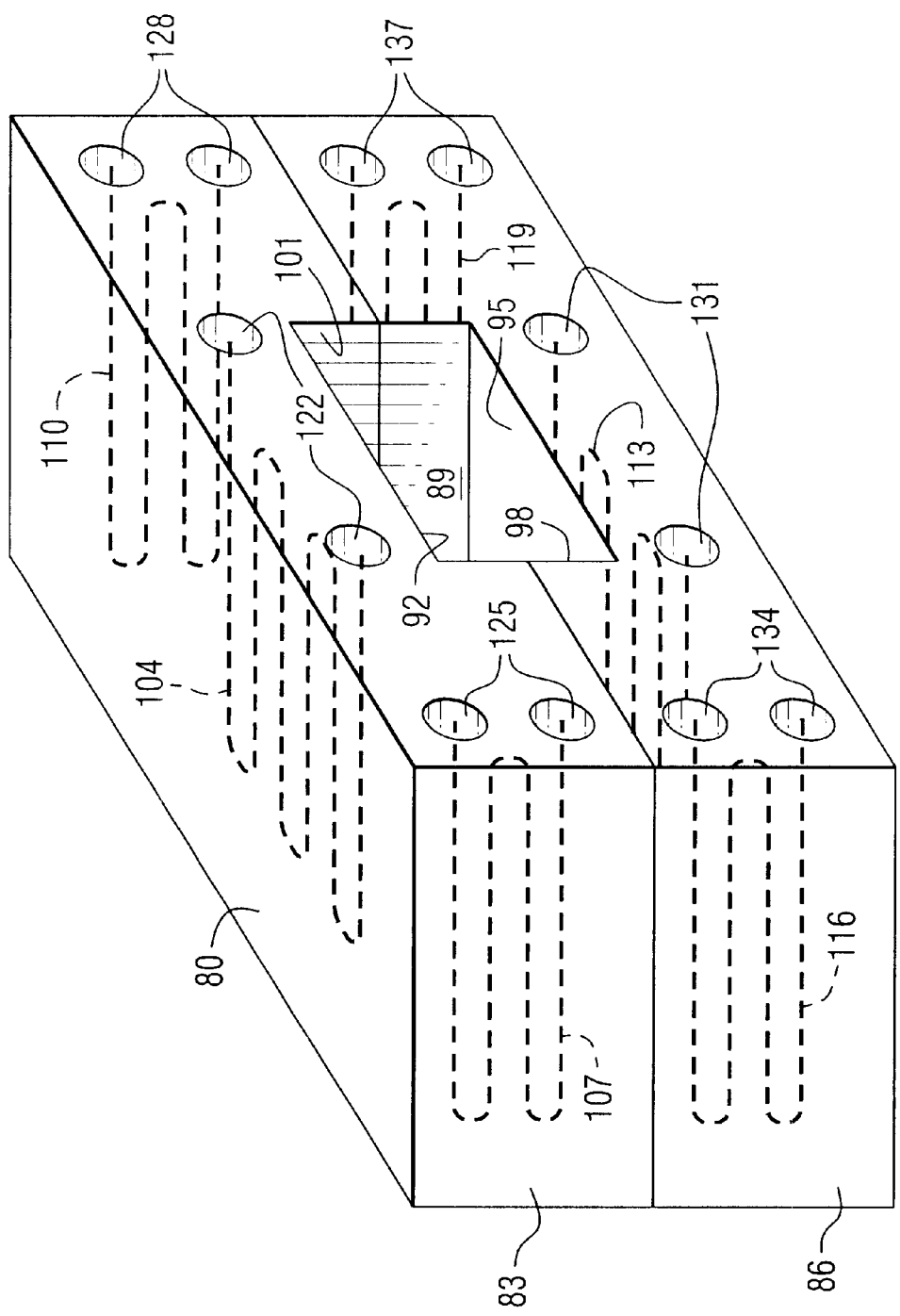
FIG. 3 shows a calibrator having multiple cooling circuits provided in each face thereof.

Referring now to FIG. 3, instead of a calibrator 60 having one cooling circuit in each of the upper and lower sections, a presently preferred alternative calibrator 80 can have multiple cooling circuits provided in each of the upper 83 and lower 86 sections. For example, the upper section 83 can include a top cooling circuit 104 with inlet and outlet openings 122, a front cooling circuit 107, with inlet and outlet openings 125 and a rear cooling circuit 110 with inlet and outlet openings 128. Similarly, the lower section 86 can include a bottom cooling circuit 113 with inlet and outlet openings 131, a front cooling circuit 116 with inlet and outlet openings 134 and a rear cooling circuit 119 with inlet and outlet openings 137.

The multiple cooling circuits 104, 107, 113, 116 and 119 can be effectively utilized to cool multiple individual surfaces of a complex shaped extrudate to varying degrees. Such localized control of the temperature at different surfaces of a multi-sided extrudate can provide the ability to control the cooling of the different sides at different rates. The different cooling rates applied can depend on various factors such as, for example, a different thickness of the different sides of the complex shaped extrudate. Where different sides have different thickness, the temperature at different sides of the extrudate can vary. Consequently, one side of the extrudate may be within a desired temperature range while a different side is not, thus adversely affecting the cutting portion of the process. Moreover, such uneven cooling can cause the extrudate to warp as one side of the extrudate can begin to "pull over" heat from another side. However, using such multiple cooling circuits 104, 107, 113, 116, 119 can permit individual control over the temperature at the different sides of the extrudate. As a result, each of multiple sides of the complex shaped extrudate, such as, for example, the extrudate 18 shown in FIG. 5, can be generally maintained within the desired temperature range, which facilitates the cutting of the extrudate 18 by the cutting blade 30.

Additionally, different cooling rates can also be applied to correct, for example, undesirable warping, if such occurs during extrusion and cooling of the extrudate. Although the shape of the opening 89 through which an extrudate can be fed is shown having a generally rectangular cross section, other shapes can be provided, including more complex shapes such as the extrudate 18 referred to above.

Figure 4:
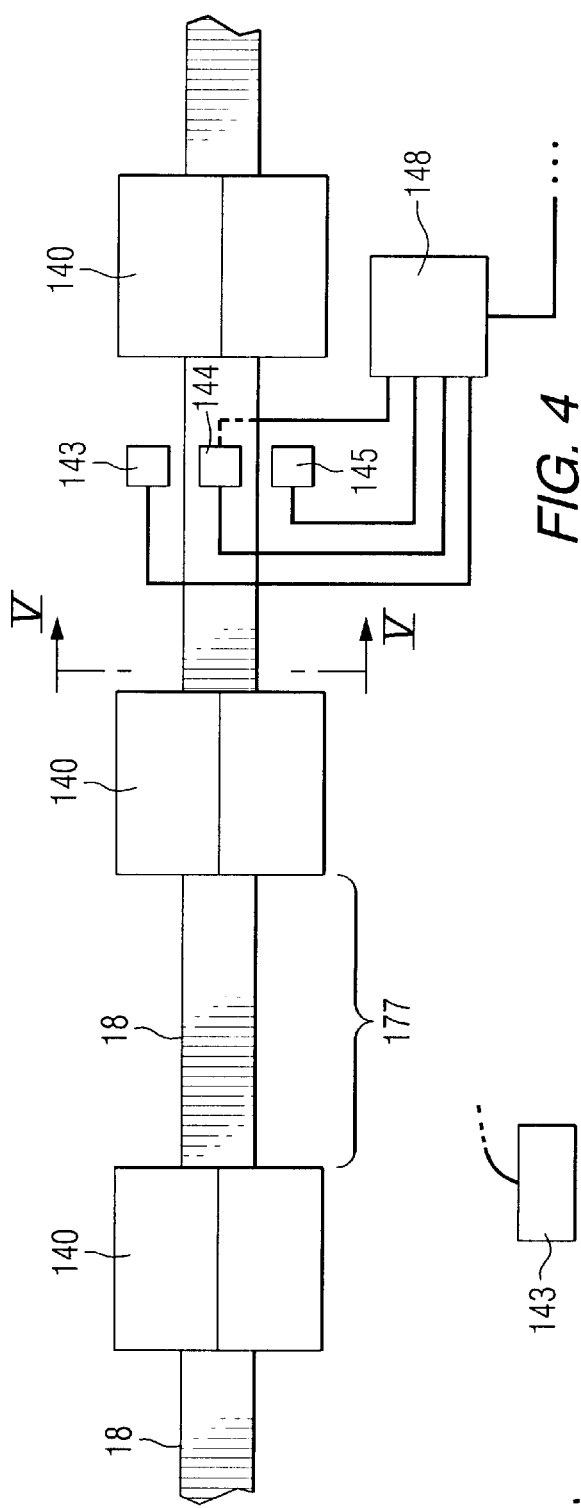
FIG. 4 shows a presently preferred embodiment of multiple temperature sensors being used with a calibrator having multiple cooling circuits.

As shown in FIG. 4, temperature sensors can be positioned, for example, in the air gaps 77 between the calibrators 140. Feedback from the multiple temperature sensors 143–146 can be provided to a device such at the temperature controller 49, shown in FIG. 2. The complex shaped extrudate 18 can have, for example, the cross section shown in FIG. 5. In the case of such multi-sided extrudate 18, four temperature sensors 143–146 can be employed. Presumably, an individual cooling circuit would be associated with each temperature sensor 143–146 to enable control over the temperature of that face of the calibrator 140. Moreover, if the calibrator 140 included more than four cooling circuits, such as the six cooling circuits shown in the calibrator 80 in FIG. 3, six temperature sensors could be used. Where multiple temperature sensors are employed, one temperature sensor may typically be associated with either each face of the multi-side extrudate 116, or with each cooling circuit that may be provided in the calibrator 140. The temperature sensors 143–146 can, for example, be conveniently positioned in the air gaps 177 between the calibrators 140. Alternatively, or additionally, the temperature sensors 143–146, or additional temperature sensors (not shown), can be positioned at each side of the calibrator 140 to detect the temperature at each side of the calibrator 140 instead of, or in addition to, the temperature of each side of the extrudate 15. Each temperature sensor 143–146 can provide feedback on the temperature at each face, or portion thereof, of the complex shaped extrudate 18. Thus, where multiple cooling circuits are utilized in the calibrators, the temperature at each face of the extrudate 18 may be adjusted as desired in order to ensure that the extrudate 18 is cooling in a uniform manner. Additionally, the cooling circuits can be controlled to adjust the temperature at the different sides of the extrudate to provide even cooling to avoid warping, bowing or other defects which can otherwise occur due to uneven cooling. Each temperature sensor 143–146 can be connected to a temperature monitoring device 148 which can supply the feedback to, for example, a device such as the temperature controller 49 shown in FIG. 1.

Figure 6:
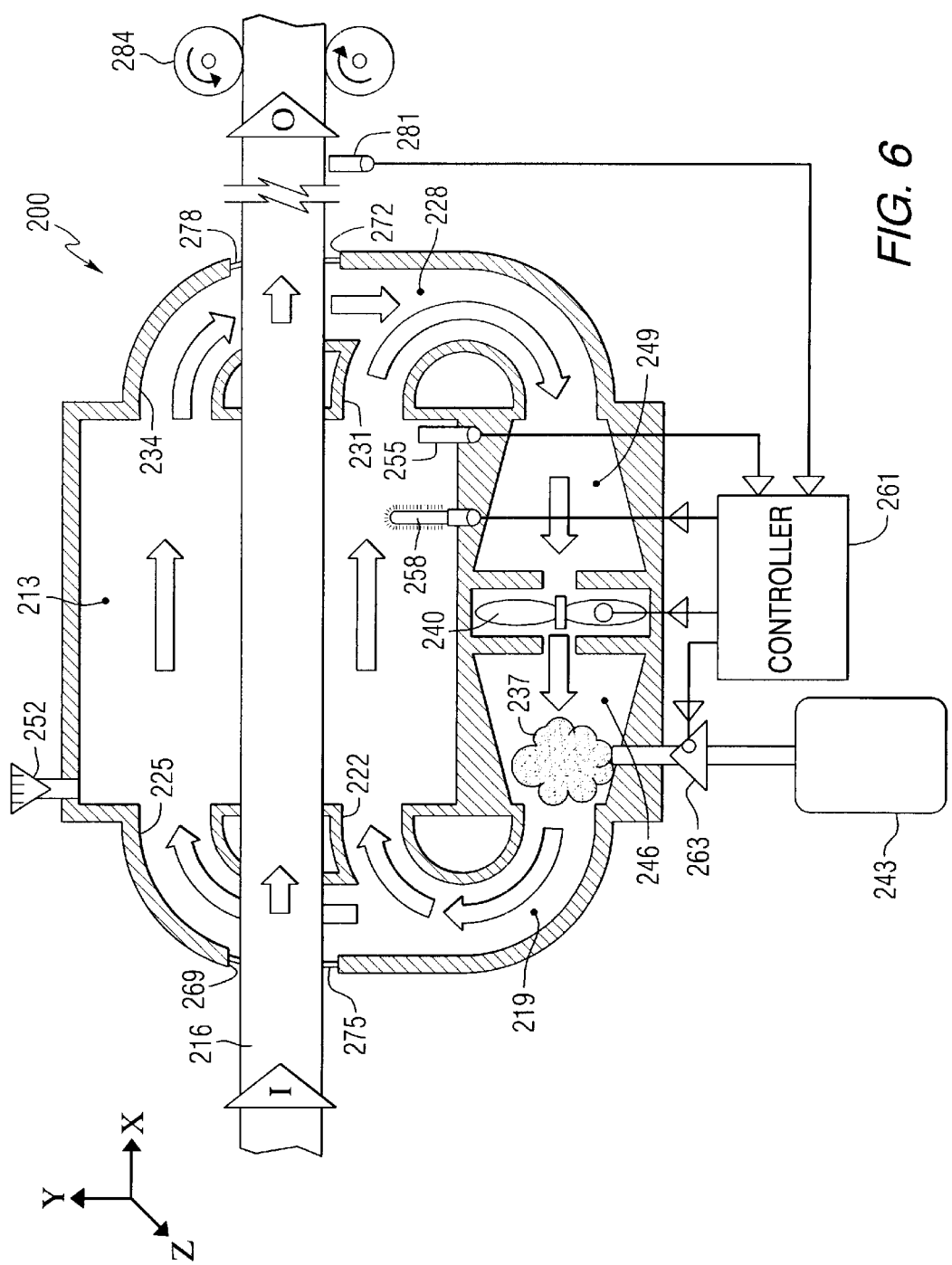
FIG. 6 is a cross sectional view of a basic schematic representation of a presently preferred embodiment of a cooling system.

An alternative cooling system 200 which utilizes a cryogen, such as liquid nitrogen, as the cooling medium is illustrated in FIG. 6. The cooling system 200 can basically replace the cooling chamber 224 and the controller 249 components of the apparatus 10 shown in FIG. 1. In other respects, the cooling system 200 can operate in generally the same manner described previously with regard to the apparatus 10, and only the specific type of cooling chamber 224/controller 249 may be different—replaced by the cooling system 200 which is specially configured to use a liquid cryogen as the coolant. The cooling system 200 shown has a central cooling chamber 213 through which an extrusion 216 can be fed so that it may be cooled to a desired temperature. Inlet passages 212, 222, 225 and outlet passages 228, 231, 234 can be provided to circulate refrigerant 237 though the central cooling chamber 213 and back to a fan 240 provided to circulate the refrigerant 37 through the system The fan 40 can be controlled to circulate the refrigerant 237 through the central cooling chamber 213 Also, it should be understood that some other means for circulating air/vaporized cryogen can be utilized instead of the fan 40. For example, a remotely located fan, or even a source of pressuized air, can be used to blow air into the cooling chamber. Preferably, the cooling system 200 is generally captive, i.e., closed, such that generally no outside air enters and the refrigerant 237 is recirculated. The refrigerant source 243, preferably liquid nitrogen, can be injected via valve 263 into a feed chamber 246 wherein the liquid nitrogen expands instantly into gaseous refrigerant 237. Alternative cryogens include liquid nitrogen, liquid carbon dioxide, liquid air and other refrigerants having normal boiling points substantially below minus 50° F. (−46° C.). The refrigerant 237 can be circulated by the fan 240 through intake passages 219, 222, 225 into the central cooling chamber 213, out return passages 228, 231, 234, and to a return chamber 249 behind the fan 240. From the return chamber 246, the refrigerant 237 is circulated by the fan 40 back through the feed chamber 249, where it can be further cooled by the injection of additional liquid nitrogen, if required. From the feed chamber 246, the refrigerant 237 is recirculated through intake passages 219, 222, 225 and back into the central cooling chamber 213. This process can be repeated as the refrigerant 237 is continuously circulated through the cooling system 200 to cool the article 216. The cooling process continues under the control of controller 261, which can regulate valve 263 to inject additional refrigerant 237 into the feed chamber 246 as needed to obtain, or maintain, a desired temperature in the central cooling chamber 213. Similarly to the puller mechanism, such as rollers 27, in FIG. 1, rollers 281 can be used to feed the extrusion 216 through the cooling chamber. The cooling system 200 can also include a number of other components for controlling, optimizing, and generally automating the cooling process. These other components can include a vent 252, a temperature sensor 255, and a heating unit 258. The controller 261 can include a microprocessor, and can control the operation of the cooling system 200, either automatically or under the control of an operator. The vent 252 can be provided, for example in the central cooling chamber 213 as shown, to release pressure build up which may be created by the expansion of the liquid nitrogen as it is injected into the feed chamber 246. The vent can simply be a small orifice. The temperature sensor 255 can be provided in communication with the central cooling chamber 213 and connected to the controller 261 to monitor the ambient temperature. The controller 261 can use temperature feedback to regulate the valve 263 for injecting refrigerant 237 into the feed chamber 246 as needed to obtain or maintain a desired temperature The heating unit 258, can be a simple heating element and can be operated by the controller 261 to increase the ambient temperature in the cooling chamber 213, if necessary, to adjust and maintain the desired ambient temperature. Various other details of the structure and method of operating the cooling system 200, and other embodiments thereof, is described in issued U.S. Pat. Nos. 6,488,873 and 6,363,730 which are hereby incorporated herein by reference.

Figure 5:
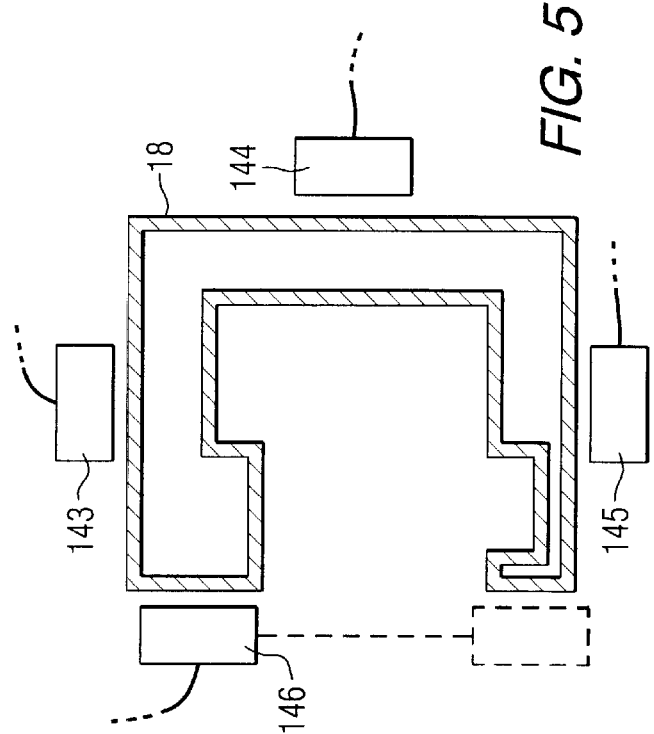
FIG. 5 shows how multiple temperature sensors can be associated with the different surfaces of a multi-sided extrudate such as shown in FIG. 4.
Figure 7:
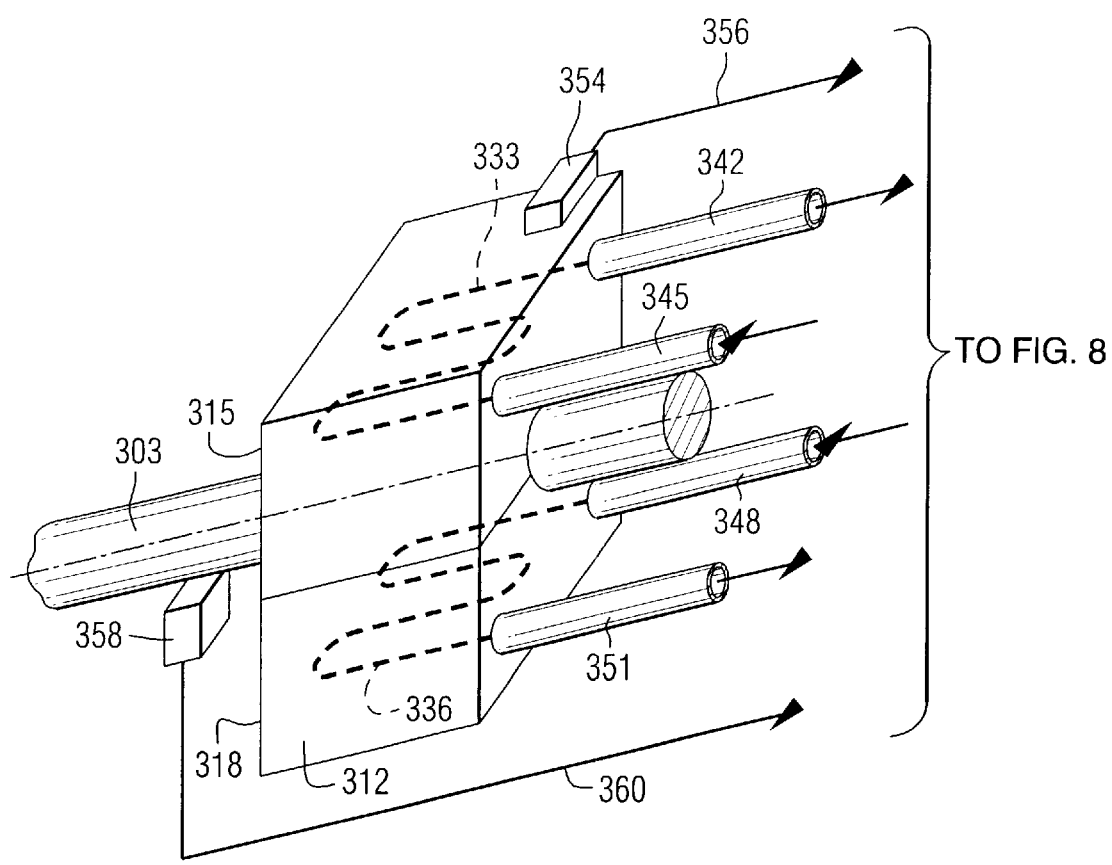
FIG. 7 is a perspective view of a presently preferred embodiment of a calibrator for cooling an extrusion.

Referring to FIG. 7, which is a perspective view of a calibrator 312, such as calibrator 60 illustrated in FIG. 2, it is shown how the calibrator 312 can be plumbed with inlet lines 345, 348 and outlet lines 342, 351 to circulate coolant through the cooling circuits 333, 336 to cool the extrusion 303. Moreover, a temperature sensor 354 can be positioned to detect the temperature of the calibrator 312 and can output temperature feedback to a temperature controller, such as temperature controller 49 in FIG. 1, via output line/signal 356. Also, whereas the temperature sensor 354 is shown positioned on the upper section 335 of the calibrator 312, a second sensor (not shown) could likewise be provided on the lower section 318 to detect the temperature of the lower section 315 such that the temperature of the upper 315 and lower 318 sections can be separately controlled. Additionally, where multiple cooling circuits are provided in each section of a calibrator, as in the calibrator 80 shown in FIG. 3, a separate temperature sensor can be provided for each cooling circuit to provide feedback to a temperature controller individually control the temperature of the coolant circulated in each cooling circuit. As shown, each cooling circuit 333, 336 can be appropriately plumbed, such as by conduits 342, 345, 348, 351, to circulate the coolant through each of the cooling circuits 333, 336. Moreover, an additional temperature sensor 358 can be positioned to detect the temperature of the extrusion 303 as it exits, or enters, the calibrator 312. Where the extrusion is multi-sided, multiple such temperature sensors can be provided at each side, as shown in FIGS. 4 and 5.

Figure 8:
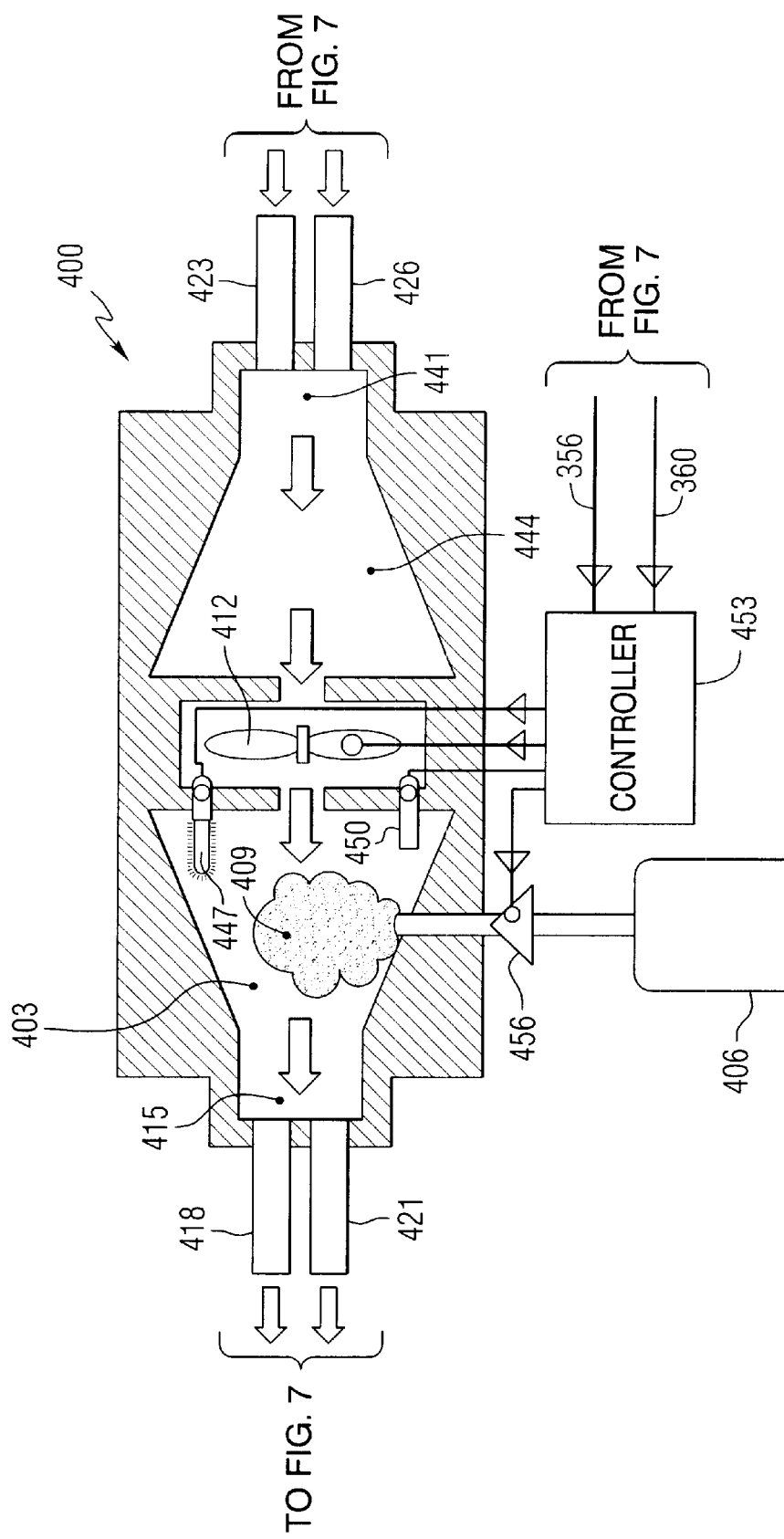
FIG. 8 is a presently preferred embodiment of a cooling system for use with a calibrator as shown in FIG. 7 to cool an extrusion.

Referring now to FIG. 8, a cooling system 400, configured similarly to the cooling system 200 shown in FIG. 6, can be used as the source of coolant to be circulated through the calibrator 312. Like the cooling system 200, the cooling system 400 can basically replace the cooling chamber 24 and the controller 49 components of the apparatus 10 shown in FIG. 1. In other respects, the cooling system 400 can operate in generally the same manner described previously with regard to the apparatus 10, and only the specific type of cooling chamber 24/controller 49 may be different— replaced by the cooling system 400 which is specially configured to use a liquid cryogen as the coolant. Thus, the cooling system 400 can be very much like the cooling system 200, with the exception that the cooling system 400 can be designed to circulate vaporized cryogen through the cooling circuits 333, 336 in the calibrator 312 instead of through a central cooling chamber.

The cooling system 400 can include a feed chamber 403 into which a liquid cryogen 406 is introduced and vaporized into a gaseous refrigerant 409. The refrigerant 409 can be circulated by a fan 412 through an intake passageway 415, which can channel the refrigerant 409 into a number of feed lines 418, 421. These feed lines 418, 421 can be equal in number to the number of inlet conduits 345, 348 provided to circulate the refrigerant 409 through the cooling circuits 333 and 336 of the calibrator 312, as shown in FIG. 7. The fan 412 circulates the refrigerant 409 from the feed chamber 403 through the intake passage 415 and the feed lines 418, 421 through cooling circuit 333, 336 inlet passages 345 and 348. The refrigerant 409 is thus circulated through the cooling circuits 333, 336 and out of the calibrator 312 through outlet passages 342, 351. As shown, the refrigerant 409 is from there circulated via return lines 423, 426 to a return inlet 441 and a return chamber 444 behind the fan 412. From return chamber 444, the fan 412 can recirculate the refrigerant 409 through the system, re-cooling it if necessary by injecting additional liquid cryogen 406 into the feed chamber 403. A controller 453 can receive temperature information from a temperature sensor 450 in the feed chamber 403 as well as from additional temperature sensors, such as temperature sensor 354 which detects the temperature of the calibrator 312 and temperature sensor 358 which detects the temperature of the extrusion 403. Temperature from the temperature sensors 450, 354, 358 can be provided to the controller 353 via lines 356 and 360. The controller 453 can utilize the information from the temperature sensors 450, 354, 358 to control the temperature of the refrigerant 303 by controlling a valve 456 which regulates the injection of liquid cryogen 406 into the feed chamber 403. In this manner the controller 453 can control cooling of the extrusion 303 as it is fed through the calibrator 312. A heating element 447 can also be provided under the control of the controller 453 in order to increase the temperature of the refrigerant 409 in the feed chamber 403 if necessary. In general, the cooling system 400 can work in conjunction with calibrators, such as calibrator 312 in FIG. 7, by controlling the cooling of the extrusion 303 using feedback from the temperature sensors 354, 358, 450 to regulate the injection of liquid cryogen 406 into the feed chamber 403 to lower the temperature of the refrigerant 409 and can increase the temperature of the refrigerant 409 by controlling the heating element 447. In most respects the cooling system 400 can operate in a similar manner to the cooling system 200 shown in FIG. 6. However, since the refrigerant 409 is circulated through internal cooling circuits 333, 336 in the calibrator 312, the refrigerant 409 is not contacting the surface of the extrusion 303. Thus, forced air convection to control the wind chill temperature in a cooling chamber by blowing refrigerant over an article is not applicable to the cooling system 400.

With regard to the cryogenic cooling system 200, 400 described in connection with FIGS. 6 and 8, those cooling systems 200, 400, similarly to as described with regard the apparatus of FIG. 1, can include additional temperature sensors associated with the extrudate 216, 303. In FIG. 1, a conveying device, such as rollers 27, feed an extrusion 15 toward a cutting blade 30, and temperature sensors 54 and 55 can be provided near the blade 30 and the rollers 27, respectively, for providing feedback to the temperature controller 49 to control the cooling of the extrudate 15. Likewise, the controller 261 of the cooling system 200, and/or the controller 453 of the cooling system 400, can also include temperature sensors positioned near the cutting blade and/or prior to the conveying device to provide temperature feedback to the controller 261, 453. As described in connection with FIG. 1, this temperature feedback can be used to control the temperature of the extrusion 216, 303, such as by controlling the temperature of the refrigerant 237, 409, to thereby obtain the benefits of such control which are described heretofore in connection with FIG. 1.

Figure 9:
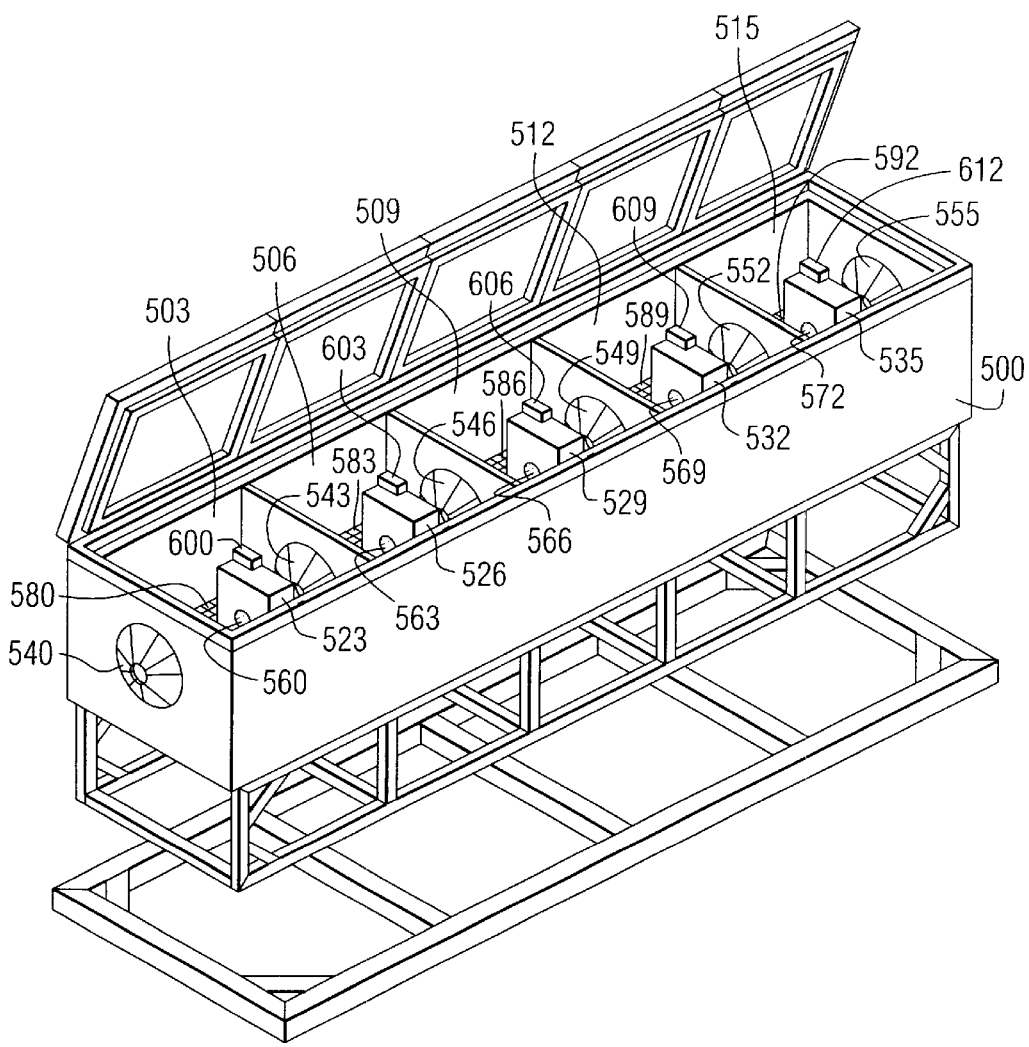
FIG. 9 is a presently preferred embodiment of a combined cooling system using calibrators enclosed within cooling chambers to cool an extrusion.

A further embodiment of the invention—a combined cooling system 500 is shown in FIG. 9, wherein calibrators 523–535 are enclosed within multiple cooling chambers 503–515. As shown, an extrusion can be cooled both by feeding it through the calibrators 523–535, and also by enclosure of the extrusion and calibrators 523–535 within the cooling chambers 530–515. The calibrators 523–535 can be supported on bases 580–592, such as screens, provided within each cooling chamber 503–515. Openings 540–555 through the walls of each cooling chamber 503–515 can be provided in alignment with the center openings 560–572 in the calibrators 523–535 through which the extrusion can be fed. The configuration and operation of the calibrator based portion of the combined cooling system 500 can be as described in connection with the cooling system 400 shown in FIG. 8. Similarly, the configuration and operation of the cooling chamber based portion of the combined cooling system 500 can generally be as described in connection with the cooling system 200 shown in FIG. 6. Otherwise, the general operation and configuration of the overall combined system 500 can also be as described in the aforementioned U.S. Pat. Nos. 6,488,873 and 6,365,730. Moreover, additional temperature sensors 600–612, each of which can be like sensors 354 shown in FIG. 7, can be utilized at one or all of the calibrators 523–535 for providing temperature feedback to a controller, such as controller 453 in FIG. 8, for regulating the temperature in not only the calibrators 523–535, but also the temperature in the cooling chambers 503–515, as may be controlled by a separate controller, such as the controller 261 in FIG. 6. Additional sensors, corresponding to sensor 358 in FIG. 7 can also be provided associated with the extrusion, for the reasons described in connection with FIG. 7.

Moreover, although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A method for cooling and cutting an extrusion comprising:
    a. producing an extrudate;
    b. engaging said extrudate for conveyance toward a cutting blade;
    c. cooling said extrudate as said extrudate is fed toward said cutting blade;
    d. sensing a first temperature of said extrudate at a point prior to said engaging and
    e. controlling said cooling of said extrudate as a function of said first temperature to maintain said first temperature within a desired range of temperatures which facilitates said conveying of said extrudate without deformation thereof.

2. The method of claim 1 wherein:
    a. said cooling further comprises passing said extrudate through a cooling chamber having a second temperature; and
    b. said controlling said cooling further comprises controlling said second temperature as a function of said first temperature to maintain said first temperature within said desired range of temperatures.

3. The method of claim 2 further comprising:
    a. sensing ambient temperature; and
    b. controlling said second temperature as a function of said first temperature and said ambient temperature.

4. The method of claim 3 wherein said engaging said extrudate comprises pulling said extrudate.

5. The method of claim 2 wherein said first temperature is brought within said desired range of temperatures in said cooling chamber by at least spraying said coolant into said cooling chamber.

6. The method of claim 5 wherein spraying said coolant into said cooling chamber further comprises spraying a liquid cryogen into said cooling chamber such that said liquid cryogen vaporizes as sprayed into said cooling chamber.

7. The method of claim 5 further comprising circulating at least one of air and vaporized coolant in said chamber to substantially vaporize said liquid cryogen as it is sprayed into said cooling chamber.

8. The method of claim 5 wherein said controlling said cooling further comprises one of decreasing and increasing said second temperature to maintain said first temperature within said desired range of temperatures.

9. The method of claim 1 wherein:
    a. said cooling further comprises passing said extrudate through at least one calibrator, said calibrator having at least one cooling circuit therein with a coolant circulated therethrough at a second temperature; and
    b. said controlling said cooling further comprises controlling said second temperature as a function of said first temperature to maintain said first temperature within said desired range of temperatures.

10. The method of claim 9 wherein said coolant comprises a cryogen which is substantially vaporized prior to being circulated through said at least one cooling circuit.

11. The method of claim 9 wherein said extrudate and said at least one calibrator have a plurality of sides, said method further comprising:
    a. providing a plurality of cooling circuits within said at least one calibrator through which said coolant is circulated at said second temperature, each of said plurality of cooling circuits associated with at least one of said plurality of sides of said at least one calibrator;
    b. sensing said first temperature of said extrudate at selected ones of said plurality of sides of said extrudate; and
    c. controlling said second temperature as a function of said first temperature selected to maintain said first temperature within said desired range of temperatures.

12. The method of claim 11 further comprising individually controlling said first temperature of at least one of said plurality of sides of said extrudate by individually controllig said second temperature at each of said plurality sides of said at least one calibrator via said plurality of cooling circuits associated with each of said plurality of sides of said at least one calibrator.

13. The method of claim 9 further comprising:
    a. sensing a third temperature of said extrudate at a point near where said extrudate exits said at least one calibrator; and
    b. said controlling said cooling further comprises controlling said second temperature as a function of said first temperature and said third temperature to maintain said first temperature within said desired range of temperatures.

14. The method of claim 9 wherein said extrudate and said at least one calibrator have plurality of sides, said method further comprising:

a. providing a plurality of cooling circuits within said at least one calibrator through which said coolant is circulated at a plurality of said second temperatures, each of said plurality of cooling circuits associated with at least one of said plurality of sides of said at least one calibrator;

b. sensing a plurality of third temperatures associated with said plurality of sides of said exdtrudate at a point near where said extrudate exits said at least one calibrator; and c. controlling said plurality of second temperatures as a function of said plurality of third temperatures such that said plurality of third temperatures are maintained nearly equal to avoid uneven cooling of said extrudate.

15. The method of claim 14 further comprising individually controlling the temperature of at least one of said plurality of sides of said extrudate by individually controlling the temperature at each of said plurality of sides of said at least one calibrator via said plurality of cooling circuits associated with each of said plurality of sides of said at least one calibrator.

16. The method of claim 9 wherein:

a. said cooling further comprises passing said extrudate through a cooling chamber subsequent to said at least one calibrator, said cooling chamber having a third temperature; and b. said controlling said cooling further comprises controlling said third temperature as a function of said first temperature to maintain said first temperature within said desired range of temperatures.

17. The method of claim 16 wherein said first temperature is brought within said desired range of temperatures in said cooling chamber by at least spraying said coolant into said cooling chamber.

18. The method of claim 16 wherein said controlling said cooling further comprises one of decreasing and increasing said third temperature in said cooling chamber to maintain said first temperature within said desired range of temperatures.

19. A method for cooling and cutting an extrusion comprising:

a. producting an extrudate;

b. feeding said extrudate toward a cutting blade;

c. passing said extrudate through a cooling chamber as said extrudate is fed toward said cutting blade;

d. cooling said extrudate in said cooling chamber by circulating vaporized cryogen around said extrudate in said cooling chamber;

e. sensing a first temperature of said extrudate at a point near said cutting blade; and f. sensing at least one of a second temperature in said cooling chamber and a third temperature of said vaporized cryogen circulated in said cooling chamber; and g. controlling said cooling of said extrudate as a function of at least one of said second and third temperatures to maintain said first temperature within a desired range of temperatures which facilitates cutting said extrudate with said cutting blade.

20. The method of claim 19 further comprising:

a. disposing at least one calibrator in said cooling chamber;

b. circulating vaporized cryogen through at least one cooling circuit provided in said at least one calibrator; and c. passing said extrudate through said at least one calibrator as said extrudate is passed through said cooling chamber such that said extrudate is additionally cooled by said at least one calibrator.

21. The method of claim 20 further comprising:

a. sensing a fourth temperature, said fourth temperature associated with at least one of the temperature of said vaporized cryogen circulated through said at least one cooling circuit and the temperature of said calibrator; and b. said controlling said cooling of said extrudate further comprises controlling said fourth temperature as a function of said first temperature to maintain said first temperature within said range of desired temperatures.

* * * * *